United States Patent
Cheng et al.

(10) Patent No.: US 11,526,663 B2
(45) Date of Patent: Dec. 13, 2022

(54) METHODS, APPARATUSES, DEVICES, AND COMPUTER-READABLE STORAGE MEDIA FOR DETERMINING CATEGORY OF ENTITY

(71) Applicant: BAIDU ONLINE NETWORK TECHNOLOGY (BEIJING) CO., LTD., Beijing (CN)

(72) Inventors: Jianyi Cheng, Beijing (CN); Min Zhao, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 694 days.

(21) Appl. No.: 16/562,018

(22) Filed: Sep. 5, 2019

(65) Prior Publication Data
US 2020/0081973 A1 Mar. 12, 2020

(30) Foreign Application Priority Data

Sep. 7, 2018 (CN) .......................... 201811043184.4

(51) Int. Cl.
*G06F 40/205* (2020.01)
*G06N 20/00* (2019.01)
*G06F 17/18* (2006.01)
*G06N 5/00* (2006.01)

(52) U.S. Cl.
CPC ............ *G06F 40/205* (2020.01); *G06F 17/18* (2013.01); *G06N 5/003* (2013.01); *G06N 20/00* (2019.01)

(58) Field of Classification Search
CPC ...... G06F 40/205; G06F 17/18; G06F 16/906; G06F 16/35; G06F 40/237; G06N 5/003; G06N 20/00; G06N 5/022; G06N 7/005
See application file for complete search history.

(56) References Cited

U.S. PATENT DOCUMENTS 7,389,230 B1 * 6/2008 Nelken ............... G10L 15/1815
704/E15.024
11,158,012 B1 * 10/2021 Rajpara ................ G06F 40/247
2011/0179030 A1 7/2011 Lee et al.
(Continued)

FOREIGN PATENT DOCUMENTS

CN 104978587 A 10/2015
CN 105912625 A 8/2016
(Continued)

OTHER PUBLICATIONS

Lu et al., "Taxonomy Induction from Chinese Encyclopedias by Combinatorial Optimization", College of Computer Science and Technology, 14 pages.
(Continued)

*Primary Examiner* — Keith D Bloomquist
(74) *Attorney, Agent, or Firm* — Fay Sharpe LLP

(57) ABSTRACT

According to embodiments of the present disclosure, a method, an apparatus, a device, and a computer-readable storage medium for determining a category of an entity are provided. The method includes: based on a suffix of the entity, obtaining a suffix feature associated with the suffix; determining one or more candidate categories of the entity based on a name of the entity; and determining a set of categories of the entity based on the one or more candidate categories and the suffix feature.

13 Claims, 4 Drawing Sheets

(56) References Cited

U.S. PATENT DOCUMENTS

| | | | | |
|---|---|---|---|---|
| 2013/0166489 | A1* | 6/2013 | Jagota | G06F 16/90344 |
| | | | | 706/46 |
| 2016/0092550 | A1 | 3/2016 | Kraft et al. | |
| 2016/0093301 | A1* | 3/2016 | Bellegarda | G06F 40/274 |
| | | | | 704/9 |
| 2020/0081973 | A1* | 3/2020 | Cheng | G06F 40/205 |

FOREIGN PATENT DOCUMENTS

| | | |
|---|---|---|
| CN | 108280064 A | 7/2018 |
| CN | 108460011 A | 8/2018 |

OTHER PUBLICATIONS

Yamada et al., "Hypernym Discovery Based on Distributional Similarity and Hierarchical Structures", National Institute of Information and Communications Technology, 9 pages.

Zhou et al., "Discover Hierarchical Lexical Hyponymy Relation From Large-Scale Concept Set", School of Computer and Information Technology, 10 pages.

Wang et al., "An Extraction Method of Hyponymy based on Multiple Data Sources Fusion", 4 pages.

Extended European Search Report for Application No. 19195661.4, dated Feb. 3, 2020, 10 pages.

Office Action for Chinese Application 201811043184.4, dated Mar. 10, 2020 (English Translation, 9 pages).

\* cited by examiner

METHODS, APPARATUSES, DEVICES, AND COMPUTER-READABLE STORAGE MEDIA FOR DETERMINING CATEGORY OF ENTITY

CROSS-REFERENCE TO RELATED APPLICATION

This application is based upon and claims priority to Chinese Patent Application No. 201811043184.4, filed Sep. 7, 2018, the entire contents of which are incorporated herein by reference.

TECHNICAL FIELD

The present disclosure generally relates to the field of computer technologies, and more particularly, to a method, an apparatus, a device, and a computer-readable storage medium for determining a category of an entity.

BACKGROUND

Artificial intelligence (AI) has been widely applied to more and more products and scenarios in the current internet environment. Text understanding, as an important AI technology, plays a crucial role in various applications such as knowledge map constructing, text processing, and automatic questioning and answering. It is a key for text understanding to determine a category of an entity (i.e. a hypernym of the entity), because the category of the entity is a key feature of the entity, which may improve the effect of text understanding technology in various scenarios.

Entities generally refer to objects or things that may be distinguished from each other in the real world or virtual world. The entity may be a named entity, such as a people name, a places name, an organization name. The entity may also be a concept-type entity such as an instant strategy game, French red wine. In general, the determination of the category of the entity needs to rely on some additional information, such as context information or information listed in the knowledge map. In the absence of such additional information, it is often impossible to accurately and finely determine the category of the entity.

SUMMARY

According to embodiments of the present disclosure, a method, a device, and a computer-readable storage medium for determining a category of an entity are provided.

According to a first aspect of embodiments of the present disclosure, there is provided a method for determining a category of an entity, comprising: based on a suffix of the entity, obtaining a suffix feature associated with the suffix; determining one or more candidate categories of the entity based on a name of the entity; and determining a set of categories of the entity based on the one or more candidate categories and the suffix feature.

According to a third aspect of embodiments of the present disclosure, there is provided an electronic device, comprising: one or more processors; and a storage device for storing one or more programs. The one or more programs are configured to be executed by the one or more processors, such that the electronic device implements the method or procedure according to the embodiments of the present disclosure.

According to a third aspect of embodiments of the present disclosure, there is provided a computer-readable storage medium having stored thereon a computer program. The computer program is executed by a processor to implement the method or procedure according to the embodiments of the present disclosure.

It is to be understood that, the content described in the Summary of the present disclosure is not intended to limit key features or important features of the embodiments of the present disclosure, and is not intended to limit the scope of the present disclosure. Other features of the present disclosure will be readily understood by the following description.

BRIEF DESCRIPTION OF THE DRAWINGS

The above and other features, advantages and aspects of the various embodiments of the present disclosure will become more from the following descriptions made with reference to the drawings. In the drawings, the same or similar reference numerals indicate the same or similar elements, in which.

DETAILED DESCRIPTION

Figure 1:
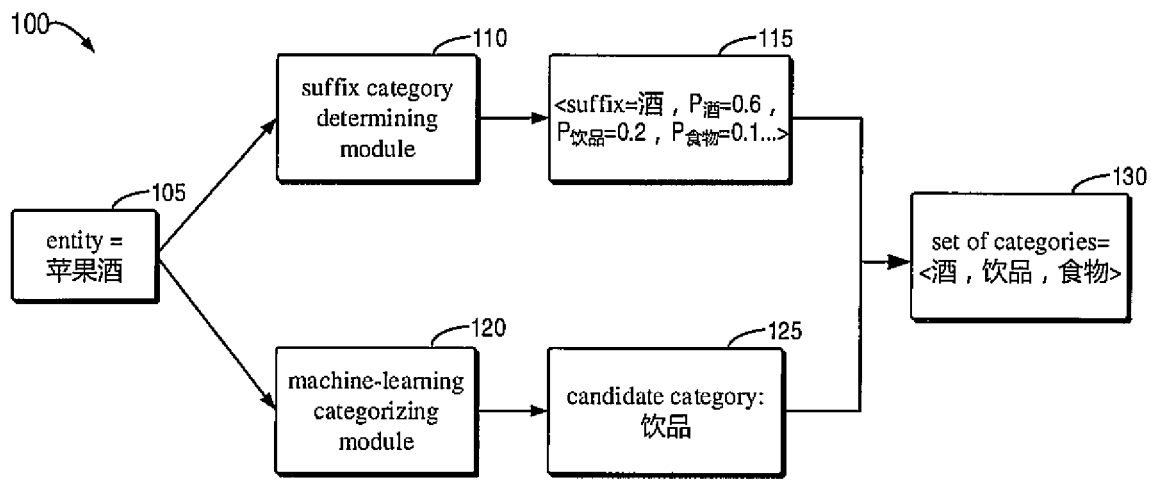
FIG. 1 illustrates a schematic diagram of an environment for determining a category of an entity, according to an embodiment of the present disclosure.

Embodiments of the present disclosure will be described in more detail below with reference to the accompanying drawings. While certain embodiments of the present disclosure are illustrated in the drawings, it is to be understood that the present disclosure may be embodied in various forms and should not be construed as limited to the embodiments set forth herein; rather, these embodiments are provided so that the present disclosure will be understood thoroughly and completely. It should be understood that the drawings and embodiments of the disclosure are for illustrative purposes only and are not intended to limit the scope of the present disclosure.

In describing the embodiments of the present disclosure, the term "comprises/includes" and its equivalents are to be understood as open-ended, i.e., "comprising/including, but being not limited to". The term "based on" is to be understood as "based at least in part on". The term "one embodiment" or "the embodiment" should be understood as "at least one embodiment". The term "some embodiments"

should be understood to mean "at least some embodiments". Other explicit and implicit definitions may also be included below.

Generally, it is necessary to determine the category of the entity (i.e., the hypernym of the entity), to implement text understanding. The conventional methods for determining the category of the entity may include the following. One of the conventional methods is a context-based method for determining the category of the entity, which may include various recognition techniques of named entities. For a text containing the entity, the category of the entity in the text is determined based on the context information of the entity. Such method may include recognizing the category of the entity by template matching, or labeling categories by machine learning models trained based on manually-labeled samples. Another of the conventional methods is a method for determining the category of the entity based on the knowledge map, which finds one or more same entities as the target entity in the knowledge map, constructs the distribution feature based on attributes of the one or more same entities, and filters the representative attributes for the target entity, thereby determining the category of the target entity.

However, the above methods both require additional data. In detail, the first method requires effective context information, but many scenarios lack context, such as short queries, new vocabularies. The second method relies on the knowledge map, but many entities are not included in the knowledge map. Especially in the general domain, high recall rate cannot be guaranteed. Therefore, the conventional methods are difficult to determine the hypernym category of the entity for the entity whose context information is insufficient and which is not included in the knowledge map. In addition, a granularity of the category of the entity which is determined by these two existing methods is usually coarse, so that the semantic information represented by output category results is limited. Therefore, the prior art cannot achieve an accurate and fine determination of the category of the entity.

Embodiments of the present disclosure propose a solution for determining a category of an entity. The embodiments of the present disclosure obtain a suffix feature based on a suffix of the entity, and obtain one or more candidate categories of the entity based on a categorization model, and then obtain the one or more categories of the entity based on the suffix feature and the one or more candidate categories. The method provided in the embodiments of the present disclosure is capable of accurately and finely determining the category of the entity without the additional information (such as context information) of the entity, as compared to the method for determining the category of the entity based on the suffix only (which may be inaccurate) or the method for determining the category of the entity based on the categorization model only (which may not be fine). Some implementations of the present disclosure will be described in detail below with reference to FIGS. 1 to 8.

FIG. 1 illustrates a schematic diagram of an environment 100 for determining a category of an entity, according to an embodiment of the present disclosure. In the environment 100, an entity (e.g., an entity 105, named as "苹果酒 (Chinese characters, which means cider)") is input simultaneously by the embodiment of the present disclosure to a suffix category determining module 110 and a machine-learning categorizing module 120, and one or more categories that the entity 105 should be categorized may be determined based on outputs of the two modules.

The suffix category determining module 110 may obtain a suffix feature 115 of a suffix "酒 (Chinese character, which means wine)" based on a suffix of the entity 105 (i.e., "酒"). In an example of FIG. 1, the suffix feature 115 includes a distribution of categories of the suffix "酒". For example, a probability that the suffix "酒" belongs to a category "酒" is 0.6, a probability that the suffix "酒" belongs to a category "饮品 (Chinese characters, which means drink)" is 0.2, and a probability that the suffix "酒" belongs to a category "食物 (Chinese characters, which means food)" is 0.1. In some embodiments, the suffix category determining module 110 may determine in advance distributions of categories of all suffixes for categorizing, based on the training corpus.

The machine-learning categorizing module 120 may be trained based on the training corpus, and categories in its categorization system typically have coarser granularity. As illustrated in FIG. 1, the entity 105 ("苹果酒") is categorized by the machine-learning categorizing module 120 to a candidate category 125, i.e., the category "饮品". It should be understood that the machine-learning categorizing module 120 may be any text categorization model currently available or developed in the future, including but being not limited to a decision tree model, a Bayesian classification model, a deep learning model, and the like. In some embodiments, the machine-learning categorizing module 120 may also employ the suffix feature output by the suffix category determining module 110 as part of its sample features to enhance the categorizing effect of the categorization model in the machine-learning categorizing module 120.

Next, the embodiment of the present disclosure, in conjunction with the two results of the suffix feature 115 and the candidate category 125, obtains a set 130 of categories that the entity 105 should be categorized. As illustrated in FIG. 1, under the example of the entity name="苹果酒", the output set of categories of the entity=<酒, 饮品, 食物>. In some embodiments, suffix matching may be performed on the candidate category of the machine-learning categorizing module 120, and then the candidate category may be refined or modified based on a result of the suffix matching. For example, it is assumed that the entity "苹果酒" is categorized to a category "饮品" by the machine-learning categorizing module 120, and the entity "苹果酒" may be refined to a category "酒" by a statistical association strength characteristic of the suffix "酒" and the category "饮品". For another example, it is assumed that the entity "苹果酒" is categorized to a category "游戏 (Chinese characters, which means drink)" by the machine-learning categorizing module 120, a result may be corrected to "rejection" by a statistical association strength characteristic of the suffix "酒" and the category "游戏". This improves the categorizing accuracy.

It should be understood that when the category of the entity is determined only by the suffix category determining module 110, the categorizing result may be inaccurate because entities of the same suffix may be distributed in multiple categories, for example, the suffix "酒" of the entity "将进酒 (Chinese characters, which is a poem name)" should be categorized to a category "作品 (Chinese characters, which means works)". In addition, when the category of the entity is determined only by the machine-learning categorizing module 120, the categories are usually not fine enough. For example, the machine-learning categorizing module 120 may categorizes the entity "苹果酒" into a category "饮品", but cannot be assigned to a finer category "酒", since the finer the category, the more training data is usually required. Compared with the prior art, the method provided in the embodiments of the present disclosure may accurately and finely determine the category of the entity by combining the suffix feature output by the suffix category determining module 110 and the candidate category generated by the machine-learning categorizing module 120.

Figure 2:
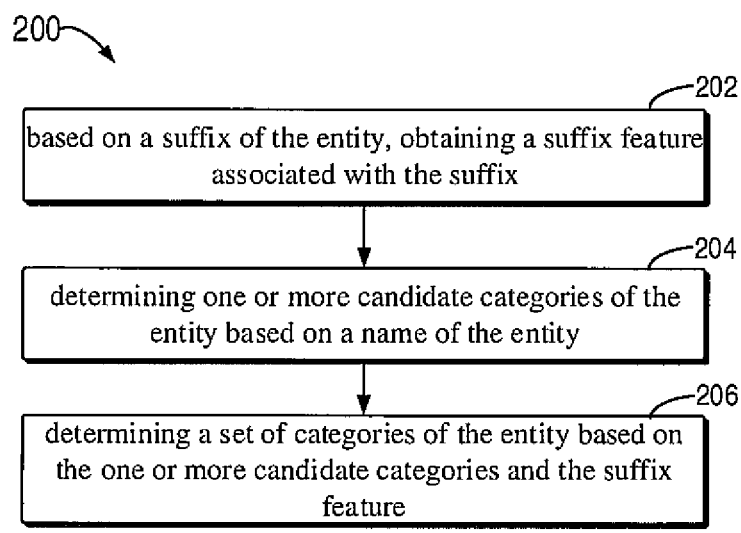
FIG. 2 illustrates a flow chart of a method for determining a category of an entity, according to an embodiment of the present disclosure.

FIG. 2 illustrates a flow chart of a method 200 for determining a category of an entity, according to an embodiment of the present disclosure. At block 202, based on a suffix of the entity, a suffix feature associated with the suffix is obtained. For example, the suffix category determining module 110 in FIG. 1 may, based on the suffix (e.g., "酒") of the entity 105, obtain the suffix feature 115 (e.g., "<suffix=酒, P酒=0.6, P饮品=0.2, P食物=0.1 . . . >") of the suffix. In some embodiments, the suffix feature may be represented as a vector, or may be a particular distribution of categories. The distribution of categories may include one or more categories associated with the suffix, and a probability of each of the one or more categories. For example, in the suffix feature 115 described with reference to FIG. 1, the probability that the suffix "酒" belongs to the category "酒" is 0.6, the probability that the suffix "酒" belongs to the category "饮品" is 0.2, and the probability that the suffix "酒" belongs to the category "食物" is 0.1. It should be understood that the term "suffix" generally means one or more words or characters at the end of the name of the entity. For example, the suffix of the entity "苹果酒" is "酒", and the suffix of the entity "ABC 有限公司 (Chinese characters, which limited Liability Company)" is "有限公司". Generally, many suffixes may indicate the category of their corresponding entity. Moreover, the last word or words in an English phrase may also be used as a suffix of an embodiment of the present disclosure. An implementation of determining a distribution of categories of the suffix may be described below with reference to FIG. 3.

At block 204, one or more candidate categories of the entity are determined based on a name of the entity. For example, the trained categorization model in the machine-learning categorizing module 120 may be employed to determine the candidate category of the entity 105 is "饮品". In some embodiments, distributions of categories of a set of suffixes may be employed as part of the training sample to train the categorization model. An implementation of categorizing the entity by the categorization model will be described below with reference to FIG. 5.

It should be understood that although step 202 in FIG. 2 is illustrated prior to step 204, step 202 may be performed after step 204, or steps 202 and 204 may be performed simultaneously. The execution order of both step 202 and step 204 is not limited in the implementation of the present disclosure. However, in embodiments where the categorization model may also be trained using distributions of categories of the set of suffixes as part of the training sample, step 202 may be performed prior to step 204.

At block 206, a set of categories of the entity is determined based on the one or more candidate categories and the suffix feature. For example, suffix matching may be performed on the basis of one or more candidate categories of the categorization model, and the one or more candidate categories may be refined or modified based on a result of the suffix matching. An implementation of determining the final category of the entity will be described below with reference to FIG. 6. It should be understood that a plurality of categories may be included in the determined set, or only one category (such as the category with the highest rank) may be included in the determined set.

Thus, the method 200 according to the embodiments of the present disclosure may accurately and finely determine the category of the entity by combining the suffix feature of the suffix of the entity with the categorizing result of the machine learning model. In some embodiments, the determined set of categories may be employed to new entity listing, text understanding tasks, automatic questioning and answering, and the like. For example, the determined set of categories of the entity may be employed as features of other text understanding applications.

Figure 3:
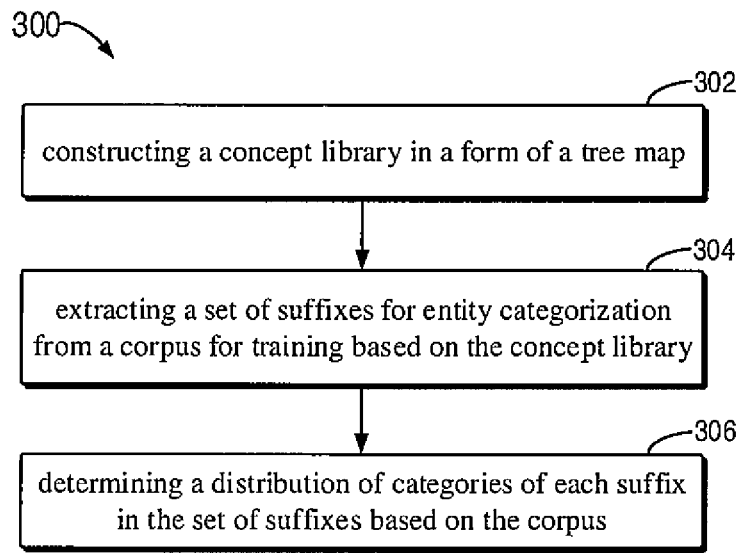
FIG. 3 illustrates a flow chart of a method for determining a distribution of categories of a suffix, according to an embodiment of the present disclosure.

FIG. 3 illustrates a flow chart of a method 300 for determining a distribution of categories of a suffix, according to an embodiment of the present disclosure. It should be understood that the method 300 may be an example implementation of step 202 in the method 200 described above with respect to FIG. 2. Moreover, for convenience of describing the method 300 in FIG. 3, a description is also made in conjunction with a concept library 400 illustrated in FIG. 4.

Figure 4:
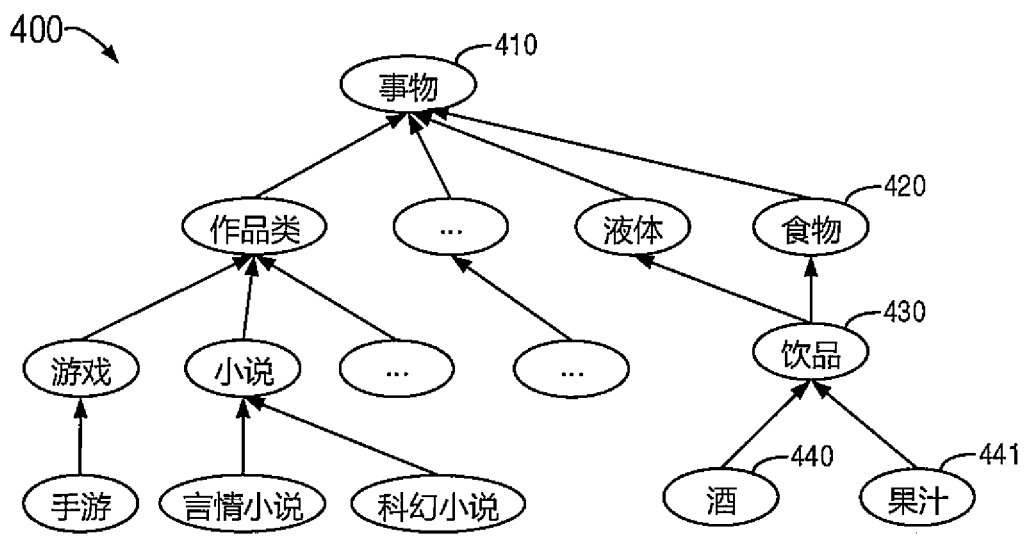
FIG. 4 illustrates a schematic diagram of a concept library in a form of a tree map, according to an embodiment of the present disclosure.

At block 302, a concept library in a form of a tree map is constructed. For example, a concept library 400 in the form of the tree map as illustrated in FIG. 4 may be constructed. As illustrated in FIG. 4, the concept library 400 is a directed acyclic tree map including a plurality of nodes and a plurality of directed edges. Each of the plurality of nodes represents a concept of the category of the entity. Each of the plurality of edges represents a hypernymy or hyponymy relationship between concepts. Thus, the determined category of the entity in the embodiment of the present disclosure may be a subset of the concept library. Continued reference to FIG. 4, in the concept map 400, a concept "事物 (Chinese characters, which means thing)" 410 of the first layer is a hypernym concept of a concept "食物" 420 of the second layer, the concept "食物" 420 of the second layer is a hypernym concept of a concept "饮品" 430 of the third layer, and the concept "饮品" 430 of the third layer is a hypernym concept of a concept "果汁 (Chinese characters, which means juice)" 441 of the fourth layer, and a hypernym concept of a concept "酒" 440. Other Chinese characters in FIG. 4 may be as follows. "作品类" means works, "液体" means liquid, "小说" means fiction, "手 游" means mobile game, "言情小说" means romantic fiction, and "科幻小说" science fiction.

Returning to FIG. 3, at block 304, a set of suffixes for entity categorization is extracted from a corpus for training based on the concept library. In some embodiments, the set of suffixes that may be employed as categories of entities may be mined from the corpus based on the concept system, and a distribution condition of each suffix may be counted. The distribution of categories of each suffix may be counted on the training corpus, and a prior probability distribution of each suffix may be counted on the open corpus. For example, for the concept library 400, some content may be manually labeled as the training corpus, distinguishing relationships of suffixes and categories may be labeled, and as many suffixes as possible are extracted.

Next, at block 306, a distribution of categories of each suffix in the set of suffixes is determined based on the corpus. For example, the suffix feature 115 as illustrated in FIG. 1 may be determined, which indicates that the probability that the suffix "酒" belongs to the category "酒" is 0.6, the probability that the suffix "酒" belongs to the category "饮品" is 0.2, the probability that the suffix "酒" belongs to the category "食物" is 0.1, and the like. Thus, the method 300 according to the embodiment of the present disclosure is capable of determining a possible distribution of categories of the entity based on the suffix of the name of the entity. The distribution of categories is based on the concept library and training data, thereby ensuring diversity and fineness of the distribution of categories.

Figure 5:
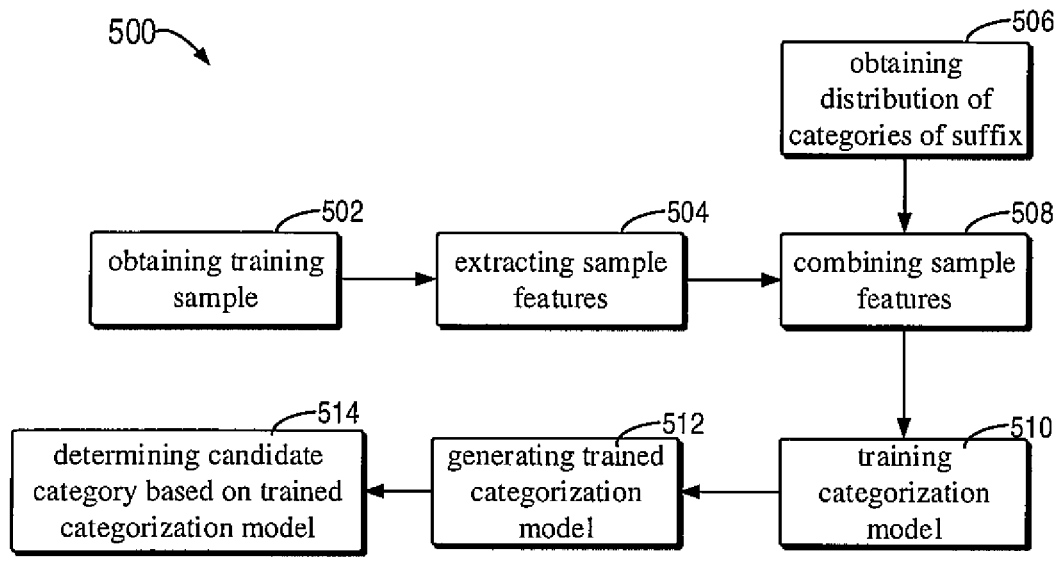
FIG. 5 illustrates a flow chart of a method for determining one or more candidate categories of an entity using a trained categorization model, according to an embodiment of the present disclosure.

FIG. 5 illustrates a flow chart of a method 500 for determining one or more candidate categories of an entity using a trained categorization model, according to an embodiment of the present disclosure. It should be understood that the method 500 may be an example implementation of step 204 in the method 200 described above with respect to FIG. 2. At block 502, a training sample for training a categorization model is obtained, and sample features are extracted at block 504. For example, several entities may be obtained, and categories of those entities may be labeled manually. The training sample may be manually-labeled category data, or category data extracted from a corpus by techniques such as named entity recognition.

At block 506, a distribution of categories of the suffix is obtained. For example, the distribution of categories of each suffix may be obtained from the suffix category determining module 110 described with reference to FIG. 1. At block 508, the sample features and the distribution of categories of the suffix are combined to obtain new sample features. That is, the embodiment of the present disclosure may employ the distributions of categories of the set of suffixes as a part of features of the training sample to train the categorization model, thereby improving the model effect. At block 510, the categorization model is trained based on the sample features, and a trained categorization model is generated at block 512. At block 514, the trained categorization model is employed to determine the candidate category of the entity. For example, the machine-learning categorizing module 120 is employed to determine that the candidate category of the entity 105 is "饮品".

In general, the categorizing result of the categorization model is limited by the pre-established categorization system. The category may correspond to one or more nodes on the concept system. For example, "游戏" may be a category, and "游戏+小说" may be also a category, which depends on sample distribution and application needs. Due to the high cost of sample construction, the categorization system usually uses coarse-grained categorization to ensure that there are enough training samples for each category. Therefore, the categories output by the categorization model are usually not detailed enough.

The categorization model provided in the embodiments of the present disclosure may be any text categorization model currently available or developed in the future, such as a decision tree model, a Bayesian classification model, a deep learning model. The decision tree model is a non-parametric classifier that solves the classification problem by constructing a tree. First, a training data set is used to construct a decision tree. Once the tree is established, it may generate a class for the unknown sample. The classification principle of the Bayesian classification model is to calculate a posterior probability by using the Bayesian formula and the prior probability, and the classification result corresponding to the maximum posterior probability may be obtained. The deep learning model converts semantics into vectors, transforms them into geometric spaces, and then gradually learns the complex geometric transformations for mapping one space to another, thus realizing the classification of entities.

Figure 6:
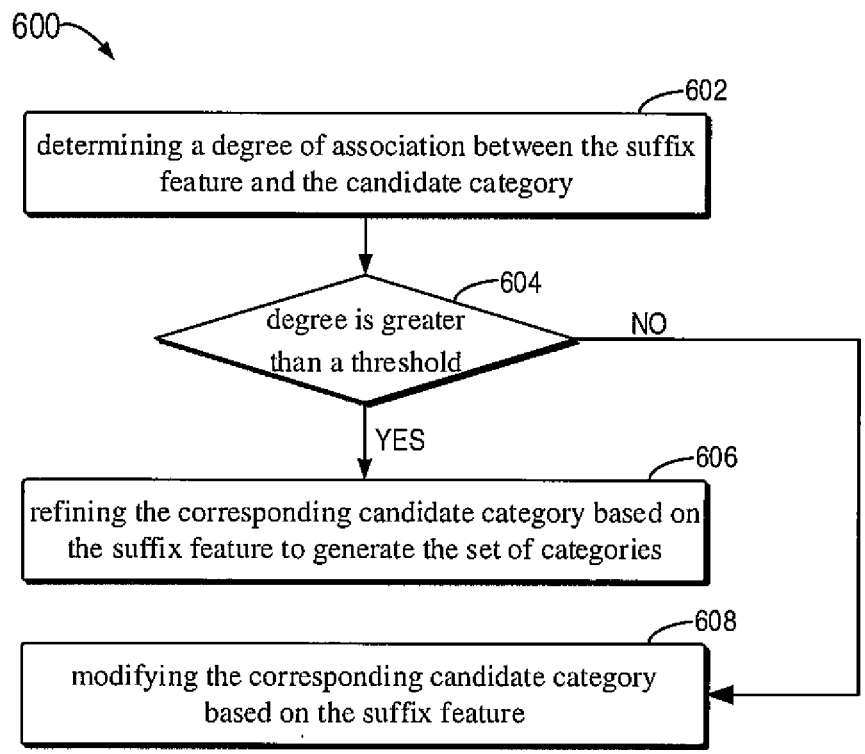
FIG. 6 illustrates a flow chart of a method for determining a category of an entity based on a suffix feature and one or more candidate categories, according to an embodiment of the present disclosure.

FIG. 6 illustrates a flow chart of a method 600 for determining a category of an entity based on a suffix feature and one or more candidate categories, according to an embodiment of the present disclosure. It should be understood that the method 500 may be an example implementation of step 206 in the method 200 described above with respect to FIG. 2. At block 602, for an entity to be categorized, a degree of association between the suffix feature and each of the one or more candidate categories is determined. For example, when the candidate category exists in the distribution of categories of the suffix feature, the suffix feature may be considered to have a higher degree of association with the candidate category, and vice versa. As another example, a semantic relevance between the suffix feature and the candidate category may be determined as the degree of association. At block 604, it is determined whether the degree of association is greater than a predetermined threshold.

When it is determined at block 604 that the degree of association is greater than the predetermined threshold, the results of the two categorization methods are associative. At block 606, the corresponding candidate category may be refined based on the suffix feature to generate the set of categories. For example, when the entity "苹果酒" is categorized to a category "饮品" by a machine learning model, the entity "苹果酒" may be refined to a finer category "酒" by the statistical association strength characteristic of the suffix "酒" and the category "饮品".

When it is determined at block 604 that the degree of association is less than the predetermined threshold, the results of the two categorization methods are inconsistent. At block 608, the corresponding candidate category may be modified based on the suffix feature. For example, when the entity "苹果酒" is categorized to a category "游戏" by a machine learning model, the result may be corrected to "rejection" by the statistical association strength characteristic of the suffix "酒" and the category "游戏" to improve categorizing accuracy. In some embodiments, for cases where the results of the two categorization methods are inconsistent, additional categorization methods may be employed for verification, or manually determined or labeled.

Accordingly, embodiments of the present disclosure are capable of determining the category of the entity only based on the name of the entity, and do not require additional entity context or entity feature data, and are capable of providing a fine-grained hypernym category in conjunction with a concept system. In this way, on one hand, the category of the suffix extracted by the embodiment of the present disclosure based on the concept system, may be as features to enhance the effect of the machine-learning categorization model, and on the other hand, the categorizing result inherits the hierarchical relationship of the concept system, which may provide rich semantic features for the text processing.

Figure 7:
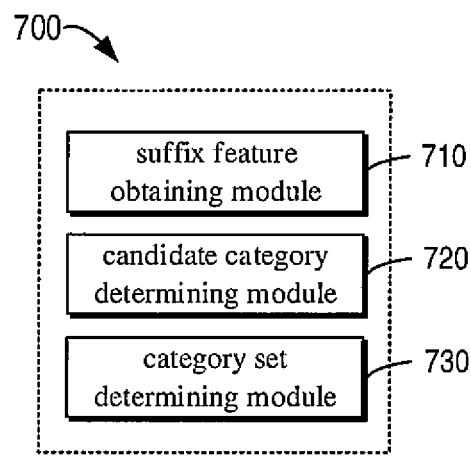
FIG. 7 illustrates a block diagram of an apparatus for determining a category of an entity, according to an embodiment of the present disclosure.

FIG. 7 illustrates a block diagram of an apparatus 700 for determining a category of an entity, according to an embodiment of the present disclosure. As illustrated in FIG. 7, the apparatus 700 includes a suffix feature obtaining module 710, a candidate category determining module 720, and a category set determining module 730. The suffix feature obtaining module 710 is configured to, based on a suffix of the entity, obtain a suffix feature associated with the suffix. The candidate category determining module 720 is configured to determine one or more candidate categories of the entity based on a name of the entity. The category set determining module 730 is configured to determining a set of categories of the entity based on the one or more candidate categories and the suffix feature.

In some embodiments, the suffix feature obtaining module 710 includes a category distribution obtaining module. The category distribution obtaining module is configured to obtain a distribution of categories of the suffix, the distribution of categories comprising one or more categories associated with the suffix, and a probability of each of the one or more categories.

In some embodiments, the category distribution obtaining module includes a category distribution determining module. The category distribution determining module is configured to determine the distribution of categories of the suffix based on a pre-built concept library, the concept library being a tree map comprising a plurality of nodes and a plurality of directed edges, each of the plurality of nodes representing a concept of the category of the entity, and each of the plurality of edges representing a hypernymy or hyponymy relationship between concepts.

In some embodiments, the category distribution determining module includes: a suffix set extracting module configured to extract a set of suffixes for entity categorization from a corpus for training based on the concept library; and a second category distribution determining module configured to determine a distribution of categories of each suffix in the set of suffixes based on the corpus.

In some embodiments, the candidate category determining module 720 includes: a categorization model training module configured to train a categorization model using the distributions of categories of the set of suffixes as part of a training sample; and a second candidate category determining module configured to determine the one or more candidate categories of the entity based on the trained categorization model.

In some embodiments, the category set determining module 730 includes: an association determining module configured to determine a degree of association between the suffix feature and each of the one or more candidate categories; and a second category set determining module is configured to determine the set of categories of the entity based on the degrees of association.

In some embodiments, the second category set determining module includes: a category refining module configured to refine the corresponding candidate category based on the suffix feature to generate the set of categories, in response to the degree of association being greater than a predetermined threshold; and a category modifying module is configured to modify the corresponding candidate category based on the suffix feature, in response to the degree of association being less than the predetermined threshold.

In some embodiments, the apparatus 700 further includes a category employing module. The category employing module is configured to employ the determined set of categories for the entity for one or more of the following: new entity listing, text understanding tasks, and automatic questioning and answering.

It should be understood that the suffix feature obtaining module 710, the candidate category determining module 720, and the category set determining module 730 illustrated in FIG. 7 may be included in a single or more electronic devices. Moreover, it should be understood that the modules illustrated in FIG. 7 may perform steps or actions in the methods or processes of the embodiments of the present disclosure.

Figure 8:
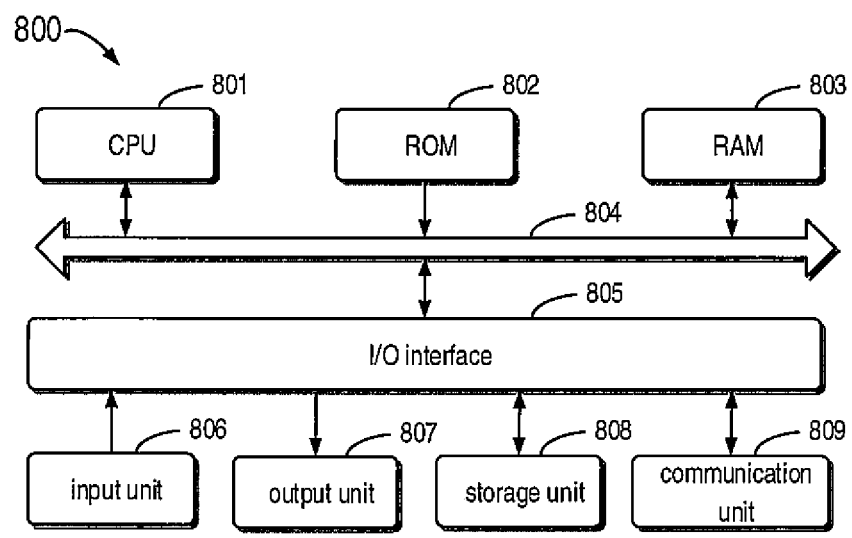
FIG. 8 illustrates a block diagram of an electronic device capable of implementing various embodiments of the present disclosure.

FIG. 8 illustrates a block diagram of an electronic device 800 capable of implementing various embodiments of the present disclosure. It should be understood that the device 800 may be configured to implement the apparatus 700 for determining a category of an entity as described in the present disclosure. As illustrated in FIG. 8, the device 800 includes a central processing unit (CPU) 801 that may perform various appropriate actions and processes based on the computer program instructions, which may be stored in a read-only memory (ROM) 802 or loaded into a random-access memory (RAM) 803 from a storage unit 808. In the RAM 803, various programs and data required for the operations of the device 800 may also be stored. The CPU 801, the ROM 802, and the RAM 803 are coupled to each other through a bus 804. An input/output (I/O) interface 805 is also coupled to bus 804.

A plurality of components in the device 800 are coupled to the I/O interface 805, which include: an input unit 806, such as a keyboard, a mouse; an output unit 807, such as a display, a speaker; a storage unit 808, such as a disk, an optical disk; and a communication unit 809, such as a network card, a modem, a wireless communication transceiver. The communication unit 809 allows the device 800 to exchange information/data with other devices over computer networks such as Internet and/or telecommunication networks.

The CPU 801 performs methods and procedures described above, such as the method 200, the method 300, the method 500, and/or the method 600. For example, in some embodiments, a method may be implemented as computer programs that are tangibly embodied in a machine-readable medium, such as the storage unit 808. In some embodiments, some or all of the computer programs may be loaded and/or installed onto the device 800 via the ROM 802 and/or the communication unit 809. When computer programs are loaded into the RAM 803 and executed by the CPU 801, one or more actions or steps of the methods described above may be performed. Alternatively, in other embodiments, the CPU 801 may be configured to perform the method by any other suitable means (e.g., by means of firmware).

The functions described above herein may be performed at least partly by one or more hardware logic components. For example, without limitation, exemplary types of hardware logic components may include: Field-Programmable Gate Array (FPGA), Application Specific Integrated Circuit (ASIC), Application Specific Standard Parts (ASSP), System on a Chip (SOC), Complex Programmable Logic Device (CPLD), and the like.

Program codes for implementing the methods of the present disclosure may be written in any combination of one or more programming languages. The program codes may be provided to a general-purpose computer, a special-purpose computer, or a processor or controller of other programmable data processing apparatus, such that when the program code are executed by the processor or controller, functions and/or operations specified in the flow charts and/or block diagrams are implemented. The program codes may be executed on the machine entirely, or partly. As a stand-alone software package, a part of the program codes may be executed on the machine and another part of the program codes may be executed on the remote machine, or the program codes may be executed on the remote machine or server entirely.

In the context of the present disclosure, a machine-readable medium may be a tangible medium that may contain or store programs used by an instruction execution system, apparatus, or device, or used in connection with an instruction execution system, apparatus, or device. The machine-readable medium may be a machine-readable signal medium or a machine-readable storage medium. The machine-readable storage medium may be, for example, but not limited to, electronic, magnetic, optical, electromagnetic, infrared, or semiconductor system, apparatus, or device, or any suitable combination of the foregoing. More specific examples of the machine-readable medium comprise but are not limited to: an electronic connection (an electronic device) with one or more wires, a portable computer enclosure (a magnetic device), a hard dish, a random-access memory (RAM), a read only memory (ROM), an erasable programmable read-only memory (EPROM or a flash memory), an optical fiber device, a portable compact disk read-only memory (CDROM), an optical storage device, a magnetic storage device, or any suitable combination of the foregoing.

In addition, although the actions or steps are described in a particular order, this should be understood that such actions or steps are required to be performed in the particular order illustrated or in the sequence, or all illustrated actions or steps should be executed to achieve the desired result. Multitasking and parallel processing may be advantageous in certain circumstances. Likewise, although several implementation details are included in the above discussion, these should not be construed as limiting the scope of the disclosure. Certain features that are described in the context of in separate embodiments may also be implemented in combination in a single implementation. Conversely, various features that are described in the context of a single implementation may be implemented in a plurality of implementations, either individually or in any suitable sub-combination.

Although the embodiments of the present disclosure have been described in terms of features and/or actions, it is understood that the subject matter defined in the appended claims is not limited to the particular features or actions described. Instead, the specific features and actions described above are merely exemplary forms of implementing the claims.

What is claimed is:

1. A method for determining a category of an entity, comprising:
    based on a suffix of the entity, obtaining by one or more computing devices, a suffix feature associated with the suffix through a suffix category determining module, wherein the suffix feature comprises one or more categories associated with the suffix, and a probability of each of the one or more categories;
    determining by the one or more computing devices, one or more candidate categories of the entity based on a name of the entity through a trained categorization model; and
    determining by the one or more computing devices, a set of categories of the entity based on the one or more candidate categories and the suffix feature, comprising:
    for an entity to be categorized in the one or more candidate categories, determining by the one or more computing devices, a degree of association between the suffix feature and the entity to be categorized;
    refining, by the one or more computing devices, the entity to be categorized based on the suffix feature to generate the set of categories, in response to the degree of association being greater than a predetermined threshold; and
    rejecting the entity to be categorized in response to the degree of association being less than the predetermined threshold.

2. The method of claim 1, wherein, obtaining the distribution of categories of the suffix, comprises:
    determining by the one or more computing devices, the distribution of categories of the suffix based on a pre-built concept library, the concept library being a tree map comprising a plurality of nodes and a plurality of directed edges, each of the plurality of nodes representing a concept of the category of the entity, and each of the plurality of edges representing a hypernymy or hyponymy relationship between concepts.

3. The method of claim 2, wherein, determining the distribution of categories of the suffix, comprises:
    extracting by the one or more computing devices, a set of suffixes for entity categorization from a corpus for training based on the concept library; and
    determining by the one or more computing devices, a distribution of categories of each suffix in the set of suffixes based on the corpus.

4. The method of claim 3, wherein, determining the one or more candidate categories of the entity, comprises:
    training by the one or more computing devices, a categorization model using the distributions of categories of the set of suffixes as part of a training sample; and
    determining by the one or more computing devices, the one or more candidate categories of the entity based on the trained categorization model.

5. The method of claim 1 further comprising:
    employing by the one or more computing devices, the determined set of categories of the entity for one or more of the following: new entity listing, text understanding tasks, and automatic questioning and answering.

6. An electronic device, comprising:
    one or more processors; and
    a storage device for storing one or more programs, wherein the one or more programs are configured to be executed by the one or more processors, such that the electronic device implements a method comprising:
    based on a suffix of the entity, obtaining a suffix feature associated with the suffix through a suffix category determining module, wherein the suffix feature comprises one or more categories associated with the suffix, and a probability of each of the one or more categories;
    determining one or more candidate categories of the entity based on a name of the entity through a trained categorization model; and
    determining a set of categories of the entity based on the one or more candidate categories and the suffix feature, comprising:
    for an entity to be categorized in the one or more candidate categories, determining by the one or more computing devices, a degree of association between the suffix feature and the entity to be categorized;
    refining, by the one or more computing devices, the entity to be categorized based on the suffix feature to generate the set of categories, in response to the degree of association being greater than a predetermined threshold; and
    rejecting the entity to be categorized in response to the degree of association being less than the predetermined threshold.

7. The electronic device of claim 6, wherein, obtaining the distribution of categories of the suffix, comprises:
    determining the distribution of categories of the suffix based on a pre-built concept library, the concept library being a tree map comprising a plurality of nodes and a plurality of directed edges, each of the plurality of nodes representing a concept of the category of the entity, and each of the plurality of edges representing a hypernymy or hyponymy relationship between concepts.

8. The electronic device of claim 7, wherein, determining the distribution of categories of the suffix, comprises:

extracting a set of suffixes for entity categorization from a corpus for training based on the concept library; and determining a distribution of categories of each suffix in the set of suffixes based on the corpus.

9. The electronic device of claim 8, wherein, determining the one or more candidate categories of the entity, comprises:

training a categorization model using the distributions of categories of the set of suffixes as part of a training sample; and determining the one or more candidate categories of the entity based on the trained categorization model.

10. The electronic device of claim 6, wherein the method further comprises:

employing the determined set of categories of the entity for one or more of the following: new entity listing, text understanding tasks, and automatic questioning and answering.

11. A computer-readable storage medium having stored thereon a computer program that being executed by a processor to implement a method comprising:

based on a suffix of the entity, obtaining a suffix feature associated with the suffix through a suffix category determining module, wherein the suffix feature comprises one or more categories associated with the suffix, and a probability of each of the one or more categories;

determining one or more candidate categories of the entity based on a name of the entity through a trained categorization model; and determining a set of categories of the entity based on the one or more candidate categories and the suffix feature, comprising:

for an entity to be categorized in the one or more candidate categories, determining by the one or more computing devices, a degree of association between the suffix feature and the entity to be categorized;

refining, by the one or more computing devices, the entity to be categorized based on the suffix feature to generate the set of categories, in response to the degree of association being greater than a predetermined threshold; and rejecting the entity to be categorized in response to the degree of association being less than the predetermined threshold.

12. The computer-readable storage medium of claim 11, wherein, obtaining the distribution of categories of the suffix, comprises:

determining the distribution of categories of the suffix based on a pre-built concept library, the concept library being a tree map comprising a plurality of nodes and a plurality of directed edges, each of the plurality of nodes representing a concept of the category of the entity, and each of the plurality of edges representing a hypernymy or hyponymy relationship between concepts.

13. The computer-readable storage medium of claim 12, wherein, determining the distribution of categories of the suffix, comprises:

extracting a set of suffixes for entity categorization from a corpus for training based on the concept library; and determining a distribution of categories of each suffix in the set of suffixes based on the corpus.

* * * * *